(12) United States Patent
Lee et al.

(10) Patent No.: US 7,906,236 B2
(45) Date of Patent: Mar. 15, 2011

(54) ANODE ACTIVE MATERIAL FOR LITHIUM SECONDARY BATTERY AND A METHOD FOR PREPARING THE SAME

(75) Inventors: Sung-Man Lee, Chuncheon-si (KR);
Heon Young Lee, Chuncheon-si (KR);
Moon Ki Hong, Chuncheon-si (KR)

(73) Assignees: LG Chem, Ltd. (KR); Kangwon National University Industry Cooperation Foundation (KR)

( * ) Notice: Subject to any disclaimer, the term of this patent is extended or adjusted under 35 U.S.C. 154(b) by 1259 days.

(21) Appl. No.: 10/566,344

(22) PCT Filed: Jul. 29, 2004

(86) PCT No.: PCT/KR2004/001914
§ 371 (c)(1),
(2), (4) Date: Aug. 3, 2006

(87) PCT Pub. No.: WO2005/011030
PCT Pub. Date: Feb. 3, 2005

(65) Prior Publication Data
US 2007/0190413 A1    Aug. 16, 2007

(30) Foreign Application Priority Data

Jul. 29, 2003   (KR) .................. 10-2003-0052422

(51) Int. Cl.
*H01M 4/58* (2010.01)
(52) U.S. Cl. ............... 429/218.1; 429/231.8; 429/231.95
(58) Field of Classification Search ............. 429/231.95, 429/231.8, 218.1
See application file for complete search history.

(56) References Cited

U.S. PATENT DOCUMENTS

| 6,548,208 | B1 | 4/2003 | Kasamatsu et al. | 429/218.1 |
| 2002/0164479 | A1* | 11/2002 | Matsubara et al. | 428/367 |
| 2003/0215711 | A1* | 11/2003 | Aramata et al. | 429/218.1 |
| 2006/0057463 | A1* | 3/2006 | Gao et al. | 429/231.95 |

FOREIGN PATENT DOCUMENTS

| JP | 2000-079153 | 3/2000 |
| JP | 2000-342532 | 5/2002 |

OTHER PUBLICATIONS

"CCCBD List of species with enthalpy of formation at 0 K." Computational Chemistry Comparison and Benchmark Database. Mar. 26, 2010. <http://cccbdb.nist.gov/hf0k.asp>.*
PCT International Search Report; International Application No. PCT/KR2004/001914; International Filing date: Jul. 29, 2003; Date of Mailing: Nov. 17, 2004.

* cited by examiner

*Primary Examiner* — Dah-Wei D Yuan
*Assistant Examiner* — Zachary Best
(74) *Attorney, Agent, or Firm* — Cantor Colburn LLP

(57) ABSTRACT

Provided are an anode active material for a lithium secondary battery having high reversible capacity and excellent charge/discharge efficiency, comprising a complex composed of ultra-fine Si phase particles and an oxide surrounding the ultra-fine Si phase particles, and a carbon material; and a method for preparing the same. The present invention also provides a method for preparing an anode active material for a lithium secondary battery comprising producing a complex composed of ultra-fine Si particles and an oxide surrounding the ultra-fine Si particles by mixing a silicon oxide and a material having an absolute value of oxide formation enthalpy ($\Delta H_{for}$) greater than that of the silicon oxide and negative oxide formation enthalpy by a mechanochemical process or subjecting them to a thermochemical reaction to reduce the silicon oxide; and mixing the Si phase-containing oxide complex and carbon material.

3 Claims, 7 Drawing Sheets

US 7,906,236 B2

ANODE ACTIVE MATERIAL FOR LITHIUM SECONDARY BATTERY AND A METHOD FOR PREPARING THE SAME

FIELD OF THE INVENTION

The present invention relates to negative active material for a lithium secondary battery and a method for preparing the same, and more particularly to an anode active material having high reversible capacity and excellent charge/discharge efficiency for a lithium secondary battery and a method for preparing the same.

BACKGROUND OF THE INVENTION

Carbon-based materials are primarily used as anode active materials for a lithium secondary battery. However, the anode composed of carbon material exhibits a maximum theoretical capacity of only 372 mAh/g (844 mAh/cc) thus limiting increase of capacity thereof. Lithium metals, studied for use as the anode material, have a high energy density and thus may realize high capacity, but have problems associated with safety concerns due to growth of dendrites and a shortened charge/discharge cycle life as the battery is repeatedly charged/discharged.

Further, a number of studies and suggestions have been proposed as to a lithium alloy serving as a material exhibiting high capacity and capable of substituting for the lithium metal. Silicon (Si) reversibly occludes and releases lithium through reaction therewith, and has a maximum theoretical capacity of about 4020 mAh/g materials and thereby is promising as a high capacity anode material. However, upon charging/discharging the battery, Si is cracked due to changes in volume resulting from reaction with the lithium, and particles of Si active material are destroyed. For this reason, as charge/discharge cycles are repeated, the capacity of the battery is sharply lowered and the charge/discharge cycle life thereof is reduced.

In order to overcome these problems, there have been studies and suggestions on a composite active material configuration composed of an active phase which reacts with lithium and an inactive phase which does not react with lithium, but there was no suggestion on the anode material for a variety of non-aqueous electrolyte-based secondary battery having composite compound composition which can exert optimal performance of the material used and a method for preparing the same as in the anode material and method for preparing the same in accordance with the present invention.

SUMMARY OF THE INVENTION

Therefore, the present invention has been made in view of the above problems, and it is an object of the present invention to provide an anode active material for a non-aqueous electrolyte-based secondary battery, having a high Li-occluding and releasing amount and thus upon use as an anode material for a non-aqueous electrolyte-based secondary battery, high charge/discharge capacity, a small amount of loss of initial irreversible capacity and an excellent charge/discharge cycle life; and a method for preparing the same.

In accordance with the present invention, the above and other objects can be accomplished by the provision of an anode active material for a lithium secondary battery comprising a complex composed of ultra-fine Si phase particles and an oxide surrounding the ultra-fine Si phase particles, and a carbon material.

In accordance with another aspect of the present invention, there is provided an anode active material for a lithium secondary battery comprising a complex composed of ultra-fine Si phase particles and an oxide surrounding the ultra-fine Si phase particles.

In accordance with yet another aspect of the present invention, there is provided a method for preparing an anode active material for a lithium secondary battery comprising, producing a complex composed of ultra-fine Si particles and an oxide surrounding the ultra-fine Si particles by mixing a silicon oxide ($SiO_x$) and a material having an absolute value of oxide formation enthalpy ($\Delta H_{for}$) greater than that of the silicon oxide and also a negative oxide formation enthalpy by a mechanochemical process or subjecting them to a thermochemical reaction to reduce the silicon oxide; and mixing the complex and carbon material.

In accordance with still another aspect of the present invention, there is provided a method for preparing an anode active material for a lithium secondary battery comprising, a process of producing a complex composed of ultra-fine Si particles and an oxide surrounding the ultra-fine Si particles by mixing a silicon oxide and a material having an absolute value of oxide formation enthalpy ($\Delta H_{for}$) greater than that of the silicon oxide and also a negative oxide formation enthalpy by a mechanochemical process or subjecting them to a thermochemical reaction to reduce the silicon oxide.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
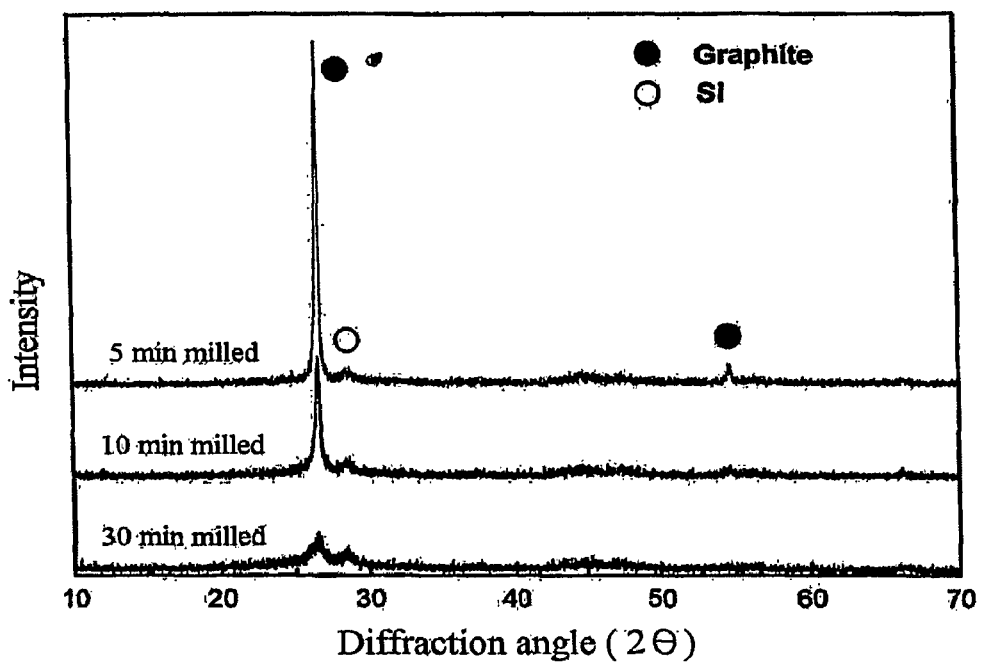
FIG. 1 illustrates X-ray diffraction patterns of a mixture of a Si-containing oxide complex and carbon in relation to a ball milling time.

Now, the present invention will be described in detail.

The anode active material in accordance with the present invention is composed of a complex of an ultra-fine Si phase and an oxide surrounding the ultra-fine Si phase, or a mixture of this complex and carbon material. The above-mentioned oxide is a non-reactive material that does not react with lithium and, in order to efficiently exhibit a restriction effect, it is preferred to minimize the size of Si phase particles. Such distribution of fine Si phases may be efficiently effected by a mechanical alloying or mechanochemical reaction method. The Si phase particles in accordance with the present invention are nano-scale particles.

The anode active material in accordance with the present invention prevents mechanical destruction of the active material through restriction and alleviation of changes in volume thereof due to reaction of the anode active material with lithium, and thereby high capacity and improved charge/discharge cycle life can be realized.

Now, a method for preparing the anode active material of the present invention will be described.

A complex having ultra-fine Si particles contained therein and an oxide surrounding the ultra-fine Si particles may be formed by mixing a silicon oxide and material having an absolute value of oxide formation enthalpy ($\Delta H_{for}$) greater than that of the silicon oxide and simultaneously negative oxide formation enthalpy by a mechanochemical process or subjecting them to a thermochemical reaction to reduce the silicon oxide.

As the silicon oxide material, $SiO_2$, SiO, SiZO ($SnSiO_3$, $MnSiO_3$, $FeSiO_3$, $Li_2TiSiO_3$, $ZnSiO_3$, LiSiON) wherein Z is Sn, Mn, Fe, Li, Zn or Ti or mechanically activated silicon oxide may be used. Mechanically activated silicon oxide means an oxide having an ultra-fine particle size. A ball milling process can provide the mechanically activated oxide. The mechanically activated oxide having an ultra-fine particle size exhibits effects such as increased mechanical strain, increased surface area and improved reactivity. Therefore, use of the mechanically activated oxide leads to reduction of the reaction time of the mechanochemical and thermochemical reactions and fine controllability of the particle size of the complex.

As the material having an absolute value of oxide formation enthalpy ($\Delta H_{for}$) greater than that of the silicon oxide and negative oxide formation enthalpy, elemental metals capable of reducing the silicon oxide or compounds containing these elemental metals may be used. As preferred examples of the elemental metals, mention may be made of Al, Fe, Li, Mn, Ni, Co, Sn, V, In, Cr, Y, Ge, Ta, Mg, Ca, Mo, Sb, Ti, Zr, Nb, P, B, $Li_3N$, etc.

The mechanochemical process may include high-energy ball milling, for example, and an alloying reaction occurs through this process, as described below. Further, the alloying reaction may also occur by the thermochemical reaction. The thermochemical reaction heat-treats reactants to induce the alloying reaction. The heat-treatment alloying reaction is preferably performed by heat-treating the reactants at a temperature of approximately 150 to 1500° C. under inert atmosphere (for example, argon atmosphere), followed by furnace cooling or quenching.

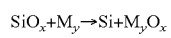

$SiO_x + M_y \rightarrow Si + M_yO_x$

Silicon oxides ($SiO_x$) are reduced to elemental Si by M and thus the resulting oxide $M_yO_x$ functions as a parent phase surrounding Si. When the Si phase reacts with Li, in order to improve restriction of the parent phase against changes in volume and strain alleviation effects, and conductivity characteristics of lithium ion through the parent phase, lithium compounds such as $Li_2O$, $Li_2O_2$, $LiNO_3$ and $Li_2S$ may be added along with M upon mechanical alloying. These lithium compounds are dispersed in the parent phase of oxide or may undergo chemical bonding with the oxide to form a complex oxide. Thereby, it is possible to obtain a complex with an ultra-fine Si phase dispersed in the parent phase of the oxide.

Preferably, M is used in an amount of 0.3 to 4 mol relative to 1 mol of the silicon oxide. Where M is used in an amount of less than 0.3 mol, the silicon oxide remains in addition to nano Si and thus irreversible capacity in the first charging/discharging becomes significantly high. Where M used exceeds 4 mol, the surplus of M contributes to volume swelling, and thereby the charge/discharge cycle characteristics may be deteriorated. The lithium compounds are preferably used in an amount of 0 to 0.6 mol relative to 1 mol of the silicon oxide.

The Si phase-containing oxide complex thus obtained may be used as an anode active material as it is, or the complex may be used in an admixture with the carbon material as an anode active material. Mixing with the carbon material may provide increased electrical conductivity of the Si phase-containing oxide complex and enhanced strain alleviation effects.

The carbon material may include amorphous carbon or crystalline carbon. Examples of the amorphous carbon include soft carbon (low temperature calcined carbon) or hard carbon (high temperature calcined carbon). The crystalline carbon includes, for example, plate-like, spherical or fibrous natural or artificial graphite. Additionally, in order to improve low temperature characteristics of the lithium secondary battery, it is also preferred to use surface-treated crystalline carbon (graphite). Even when propylene carbonate is used as the electrolyte, this surface-treated crystalline carbon does not exhibit a delamination phenomenon upon occluding lithium. As a method for surface treating the crystalline carbon, a method may be used which involves coating the crystalline carbon with a low crystalline or amorphous carbon precursor and heat-treating to carbonize the carbon precursor. This coating method may include both dry and wet mixing. In addition, a deposition process such as chemical vapor deposition may be employed.

Preferably, the Si phase-containing oxide complex and carbon material are mixed in a weight ratio of 5-90:95-10. Where the Si phase-containing oxide complex is less than 5% by weight, it does not significantly contribute to the capacity of the battery. On the other hand, where it exceeds 90% by weight, there is a deterioration of charge/discharge cycle characteristics due to problems associated with volume swelling.

The Si phase-containing oxide complex and carbon material may be used in an admixture therebetween or this mixture may be ball milled to induce chemical bonding therebetween, whereby a uniform complex compound can be effectively obtained. However, an irreversible capacity may be increased due to increased surface area caused by ball milling of the carbon material. In particular, when graphite is used as the carbon material, the irreversible capacity is more significantly decreased. Coating the nano Si phase-containing oxide complex-carbon material with a low crystalline or amorphous carbon, so as to modify the surface thereof, may significantly reduce this irreversible capacity due to this carbon material and thus the charge/discharge cycle characteristics may be improved.

As a method for modifying the surface of the nano Si phase-containing oxide complex-carbon material, a method may be used which involves coating the oxide complex-carbon material with a low crystalline or amorphous carbon precursor and heat-treating to carbonize the carbon precursor. This coating method may include both dry and wet mixing. In addition, a deposition process such as a chemical vapor deposition may be employed.

EXAMPLE

Now, the present invention will be described in more detail with reference to the following Examples. These examples are provided only for illustrating the present invention and should not be construed as limiting the scope and sprit of the present invention.

Example 1

SiO, Al and $Li_2O_2$ were mixed in a molar ratio of 1:1:0.2, and ball milled to prepare the Al—Li—O oxide matrix surrounding Si of a nano size through a mechanical alloying reaction. This Si-containing oxide complex and carbon (SFG 44, graphite) were mixed in a weight ratio of 50:50, then ball milled to prepare a nano Si-containing oxide complex-graphite anode active material. FIG. 1 shows X-ray diffraction patterns of the anode active material in relation to a ball milling time (5, 10 and 30 min). As the milling time increased, the graphite showed changes in the structure thereof, but there were no such changes in the nano silicon complex. Further, when the crystallite grain size of Si was calculated using the Scherrer equation and the X-ray diffraction patterns, Si was found to have a nano-crystalline structure of 16.2 nm.

Figure 2:
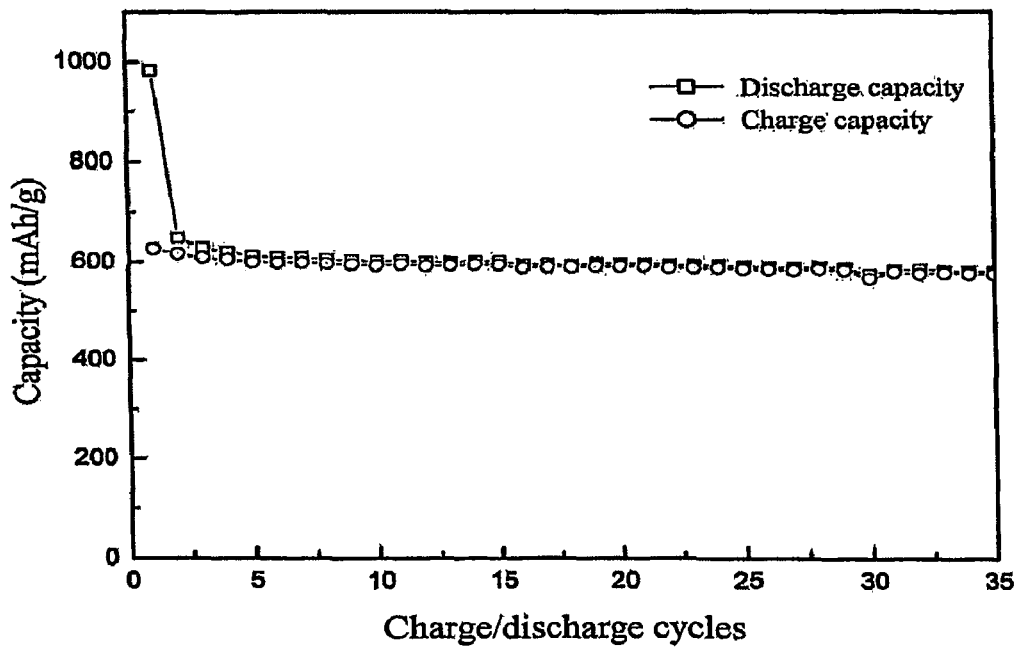
FIG. 2 illustrates charge/discharge capacity of a mixture of a nano Si-containing oxide complex and graphite (milled for 10 min) with respect to charge/discharge cycles.

A charge/discharge capacity curve of the nano Si-containing oxide complex-graphite active material (10 min milling) with respect to charge/discharge cycles is shown in FIG. 2. In FIG. 2, □ represents the discharge capacity and O represents the charge capacity. As shown in FIG. 2, the prepared anode active material exhibited a high capacity of about 600 mAh/g and excellent charge/discharge cycle characteristics.

Example 2

Figure 3:
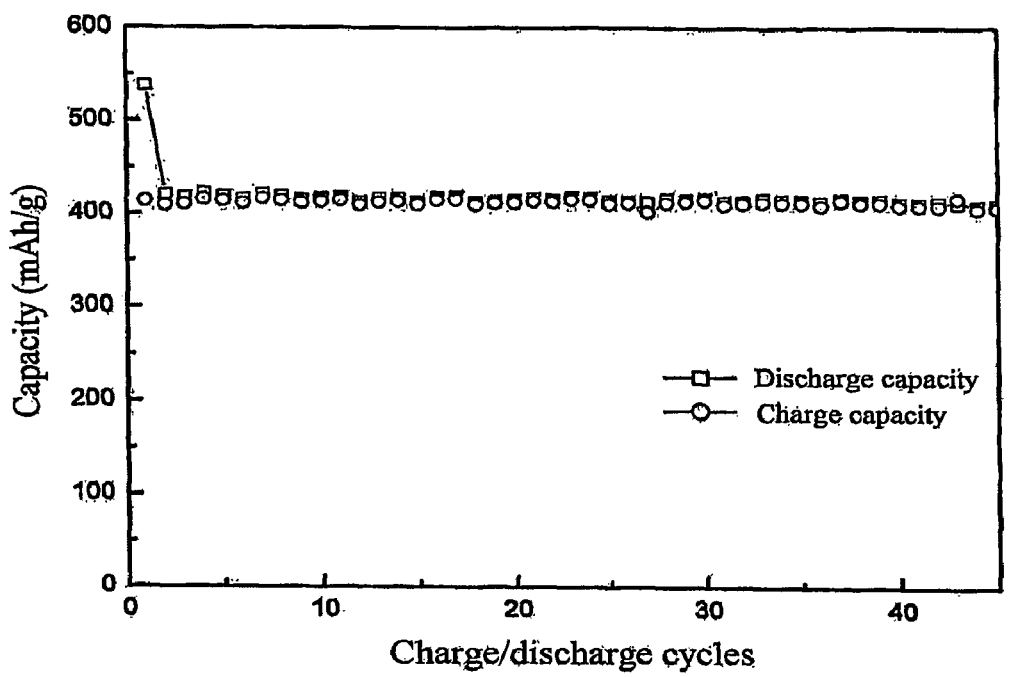
FIG. 3 illustrates charge/discharge capacity of an anode material in accordance with Example 2 with respect to charge/discharge cycles.

In order to coat with a low crystalline carbon material, the nano Si-containing oxide complex-graphite anode active material (10 min milled) prepared in Example 1 was mixed with a carbon precursor (coal tar pitch) which is carbonized through a melting process upon carbonizing, and heat treated at a temperature of 900° C. for 1 hour under argon atmosphere. The charge/discharge capacity of the anode material thus obtained, with respect to charge/discharge cycles, is shown in FIG. 3. FIG. 3 shows that the anode material had a capacity of about 420 mAh/g greater than the theoretical capacity of graphite (372 mAh/g), and an excellent charge/discharge cycle characteristics. Further, as can be seen in FIG. 3, the initial irreversible capacity significantly decreased as compared to the anode material of Example 1 in which the surface treatment by coating of the low crystalline carbon material was not done.

Therefore, coating with the low crystalline carbon material may not only decrease initial irreversible capacity, but also significantly improve the charge/discharge cycle characteristics.

Example 3

Figure 4:
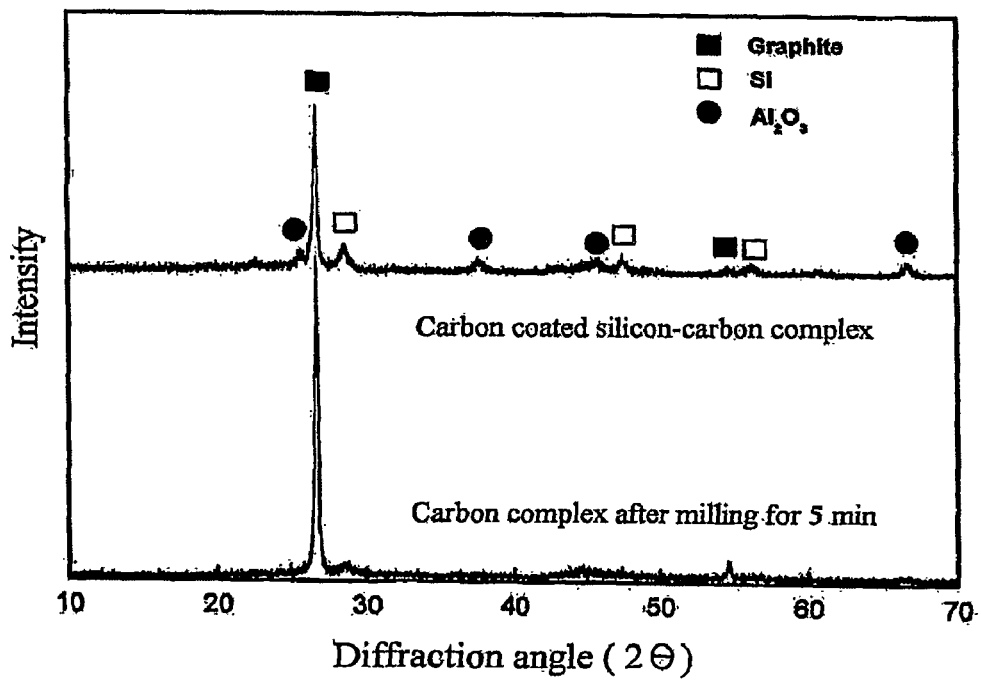
FIG. 4 illustrates X-ray diffraction patterns of an anode material in accordance with Example 3.

In order to coat with a low crystalline carbon material, the nano Si-containing oxide complex-graphite anode active material (5 min milled) prepared in Example 1 was mixed with a carbon precursor (coal tar pitch) and heat treated at a temperature of 900° C. for 1 hour under argon atmosphere. X-ray diffraction patterns of the anode material thus obtained, with respect to charge/discharge cycles, are shown in FIG. 4. It can be seen from the decreased graphite peaks that the surface of the complex was well coated with a low crystalline carbon layer. Despite the fact that the heat treatment temperature was 900° C., the peak of silicon or alumina ($Al_2O_3$) did not greatly increase and they were present in a nano-crystalline state. When a crystallite grain size of Si was calculated using the Scherrer equation and the X-ray diffraction patterns, Si was found to have a nano-crystalline structure of 14.8 nm. This result is similar to the X-ray diffraction patterns (FIG. 1) of Example 1 in which the heat treatment was not done. That is, in the case of the anode active material of Example 1 synthesized by a mechanochemical process, since silicon is present as a nano particle, or there is a matrix, the nano-crystalline state was maintained as it is, in spite of the high temperature heat treatment at 900° C.

Figure 5:
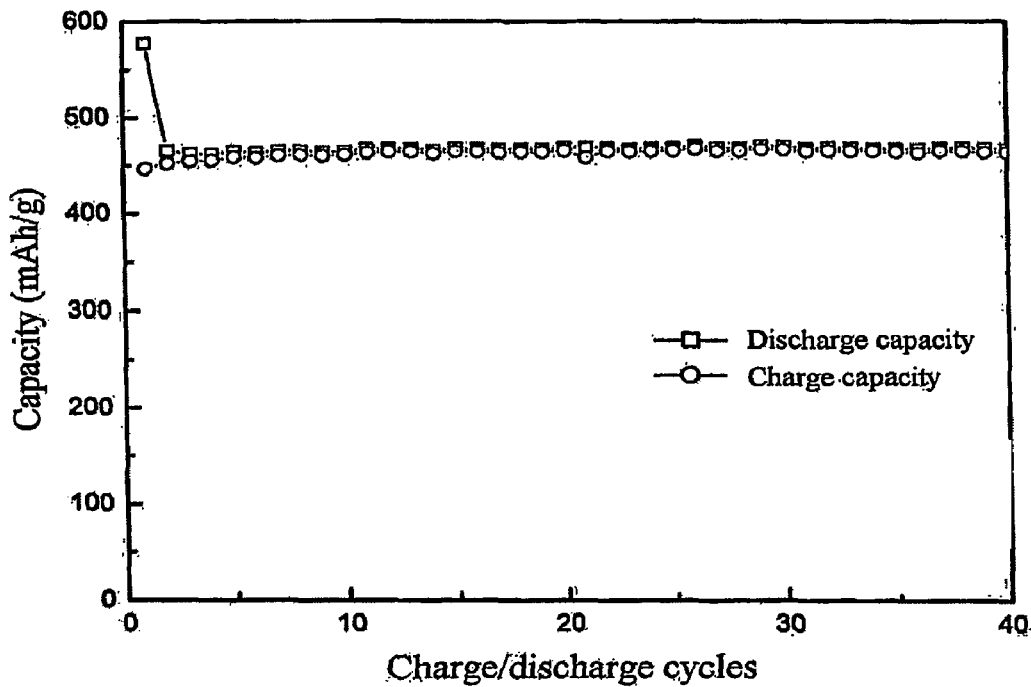
FIG. 5 illustrates charge/discharge capacity of the anode material in accordance with Example 3 with respect to charge/discharge cycles.

FIG. 5 shows the charge/discharge capacity of the anode material in Example 3 with respect to charge/discharge cycles. As can be seen in FIG. 5, the anode material exhibits a high capacity of about 465 mAh/g, and an excellent charge/discharge cycle characteristics and low initial irreversible capacity.

Figure 6:
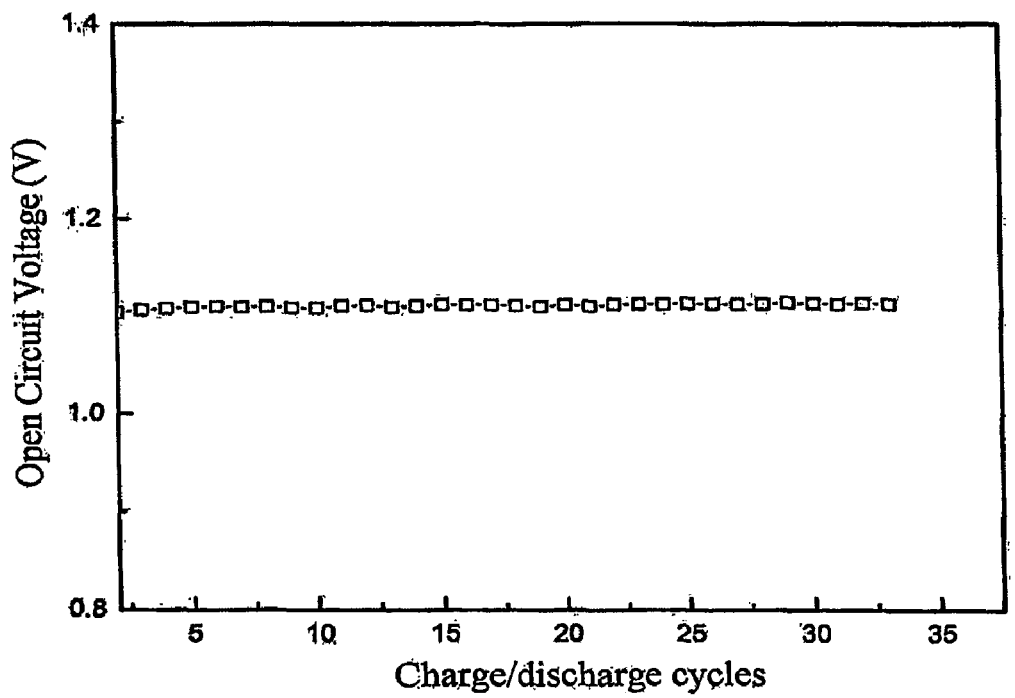
FIG. 6 illustrates open circuit voltage (OCV) after a rest time of 10 min following charging of the anode material in accordance with Example 3 with respect to charge/discharge cycles.

FIG. 6 shows an open circuit voltage (OCV) after a rest time of 10 min following charging of the anode material in accordance with Example 3 with respect to charge/discharge cycles. As can be seen in FIG. 6, the open circuit voltage (OCV) with repetition of cycles was constant without changes. However, upon charging/discharging, silicon is cracked due to changes in volume resulting from reaction with the lithium. Also, Si active material particles are destroyed, thus an inner resistance is increased. Accordingly, the open circuit voltage (OCV) increases with respect to charge/discharge cycles. Therefore, no change in OCV represents that the carbon-coated nano silicon-carbon complex prevents events such as cracking of silicon due to changes in volume resulting from reaction with the lithium, which had been previously most significantly pointed out in silicon.

Examples of these results are explained in more detail with reference to Example 4.

Example 4

Figure 7:
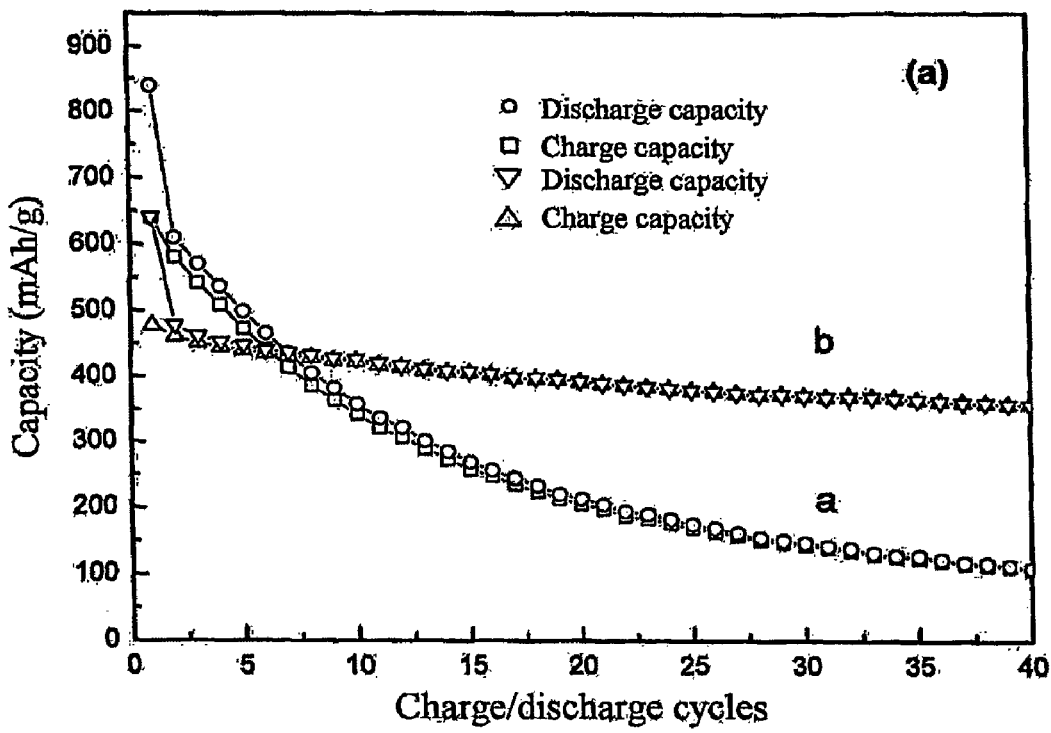
FIG. 7 illustrates charge/discharge capacity of a Si-containing oxide complex in accordance with Example 4 with respect to charge/discharge cycles.
Figure 8:
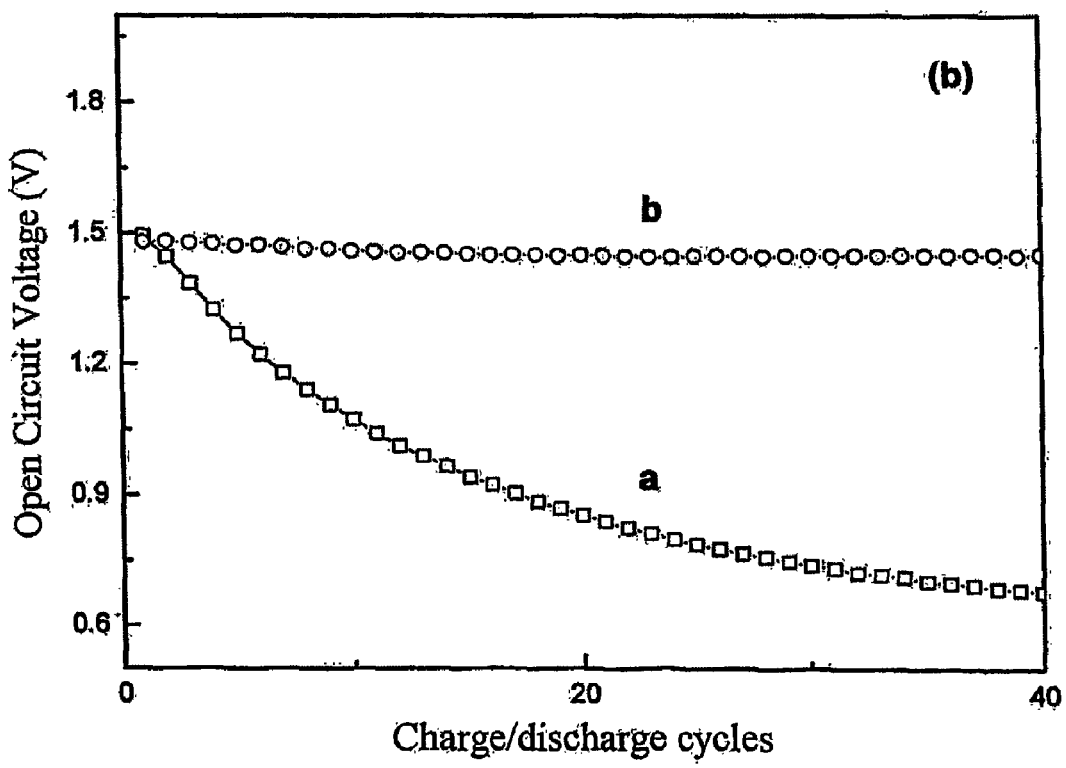
FIG. 8 illustrates open circuit voltage (OCV) of the Si-containing oxide complex in accordance with Example 4.

$SiO_2$, Al and $Li_2S$ were mixed in a molar ratio of 3:4.2:0.3, and ball milled to prepare an Al—Li—O—S complex oxide matrix anode active material surrounding nano size Si through a mechanical alloying reaction. FIGS. 7 and 8 show, respectively, the charge/discharge capacity and open circuit voltage (OCV) of the Si-containing complex oxide with respect to charge/discharge cycles. As shown in FIGS. 7 and 8, the charge/discharge capacity decreases with the increase of charge/discharge cycles (line a), and OCV also decreases toward a low voltage (line a), similarly to the charge/discharge curve. This represents that upon charging/discharging, Si is cracked due to changes in volume resulting from reaction with the lithium and Si active material particles are destroyed, whereby the charging/discharging capacity is decreased and the inner resistance is increased.

However, in the case of the anode active material prepared by mixing the Si-containing complex oxide and carbon (graphite, SFG44) using only a mortar to form a Si-containing complex oxide-carbon complex, as can be seen in FIGS. 7 and 8, the charge/discharge capacity (line b) and open circuit voltage (OCV) (line b) curves are constantly maintained, respectively.

Figure 9:
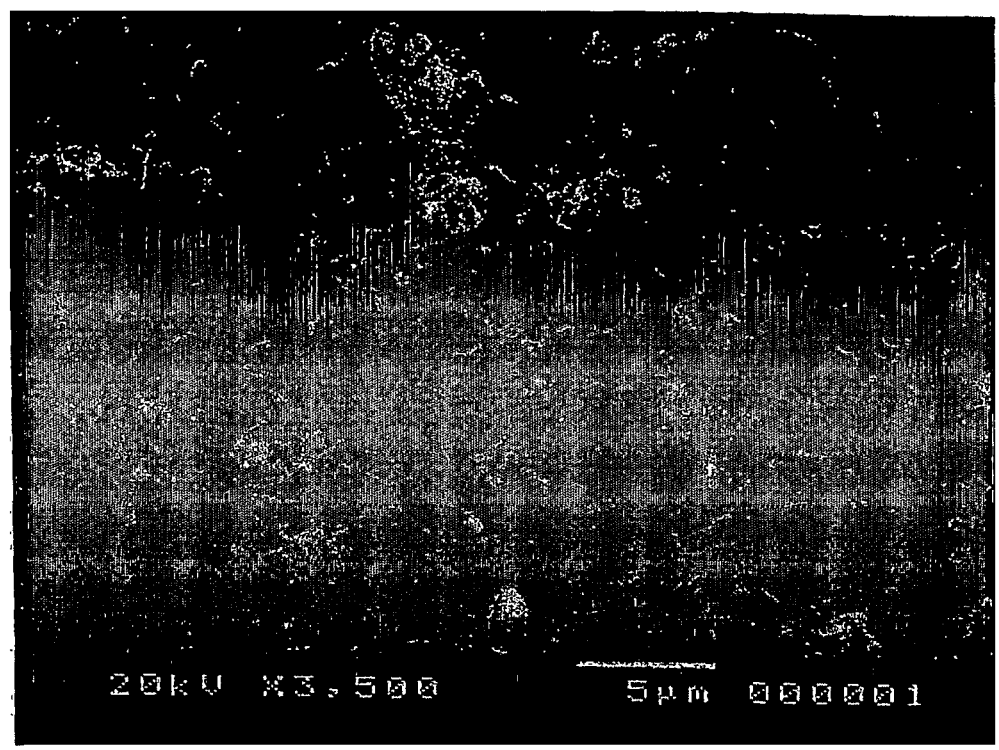
FIG. 9 is an SEM micrograph of an electrode after 40 times charging/discharging of a Si-containing oxide complex-carbon anode material in accordance with Example 4.

FIG. 9 shows an SEM micrograph of an electrode after 40 times charging/discharging of a Si-containing oxide complex-carbon anode active material. As can be seen in FIG. 9, the Si-containing oxide complex-carbon anode active material exhibits little crack.

Example 5

Figure 10:
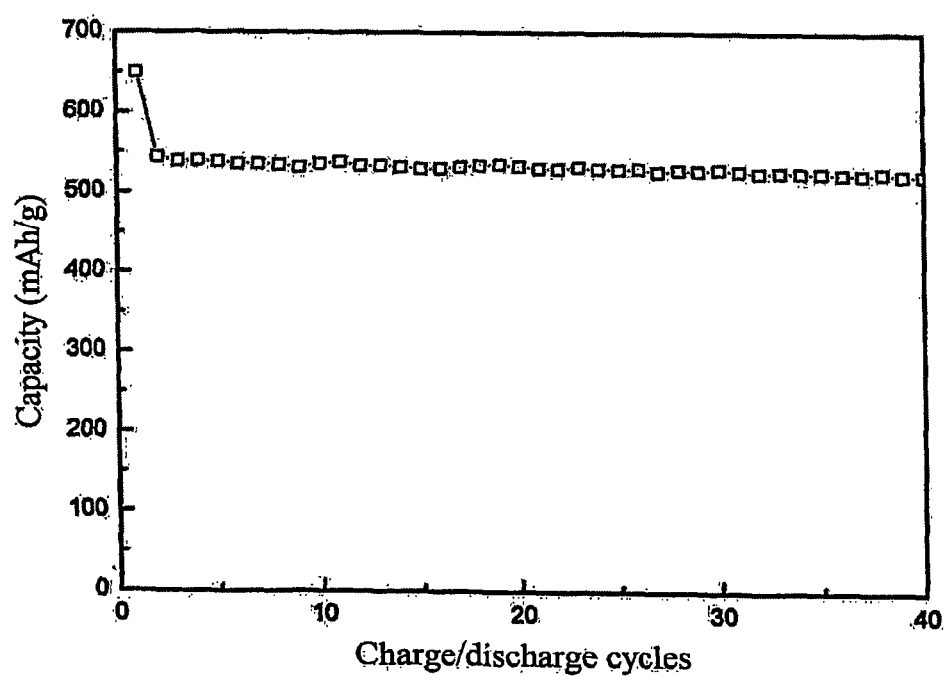
FIG. 10 illustrates the discharge capacity of an anode material in accordance with Example 5 with respect to charge/discharge cycles.

SiO, Al and $Li_2O_2$ were mixed in a molar ratio of 1:1:10.2, and ball milled to prepare an Al—Li—O complex oxide matrix surrounding nano size Si through a mechanical alloying reaction. This Si-containing complex oxide and carbon (SFG 6, graphite) were mixed in a weight ratio of 50:50 and then ball milled to prepare a Si-containing complex oxide-carbon complex. This complex and a carbon precursor (coal tar pitch) were mixed and heat-treated at a temperature of 900° C. for 1 hour under argon atmosphere to obtain the anode material. FIG. 10 shows discharge capacity of the anode material thus obtained, with respect to charge/discharge cycles. As shown in FIG. 10, the anode material exhibits a high capacity of about 530 mAh/g and also an excellent charge/discharge cycle characteristics. This represents that even addition of carbon having different morphology and particle size provides an excellent characteristics.

Example 6

Figure 11:
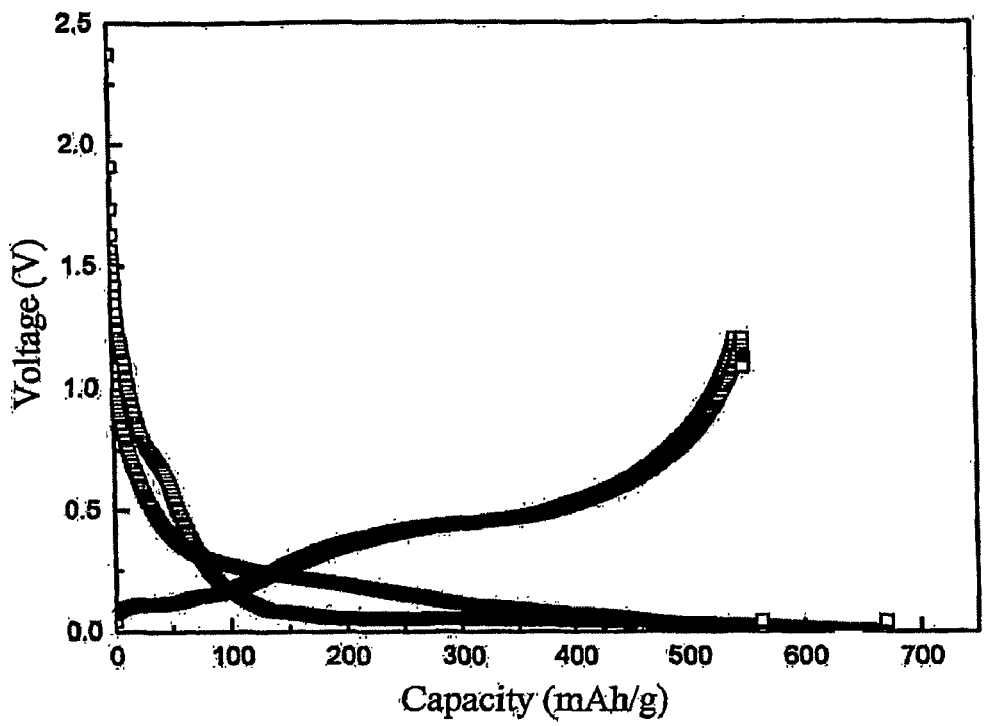
FIG. 11 illustrates the charge/discharge curve of the anode material in accordance with Example 6.

SiO, Al and $Li_2O_2$ were mixed in a molar ratio of 1:1:0.2, and ball milled to prepare an Al—Li—O complex oxide matrix surrounding nano size Si through a mechanical alloying reaction. This Si-containing complex oxide and carbon (SFG 6, graphite) were mixed in a weight ratio of 60:40 and then ball milled to prepare a Si-containing oxide complex-carbon anode active material. This anode active material and a carbon precursor were mixed and heat-treated at a temperature of 900° C. for 1 hour under argon atmosphere to obtain an anode material. FIG. 11 illustrates the charge/discharge curve of the anode material thus obtained. As shown in FIG. 11, the charge/discharge curve appears at a low voltage and it is suitable as an anode material for a lithium secondary battery.

Figure 12:
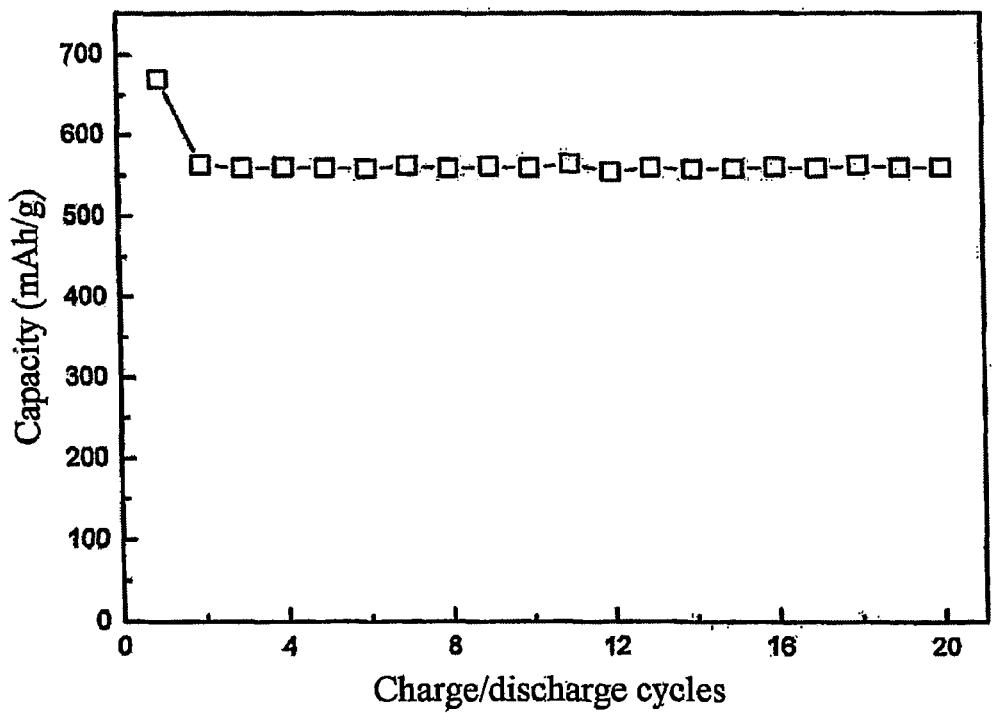
FIG. 12 illustrates the charge/discharge capacity of the anode material in accordance with Example 6 with respect to charge/discharge cycles.

FIG. 12 shows the charge/discharge capacity of the above-mentioned anode material with respect to charge/discharge cycles. As can be seen in FIG. 11, the anode material exhibits a high capacity of 550 mAh/g and an excellent charge/discharge cycle characteristics.

Example 7

Figure 13:
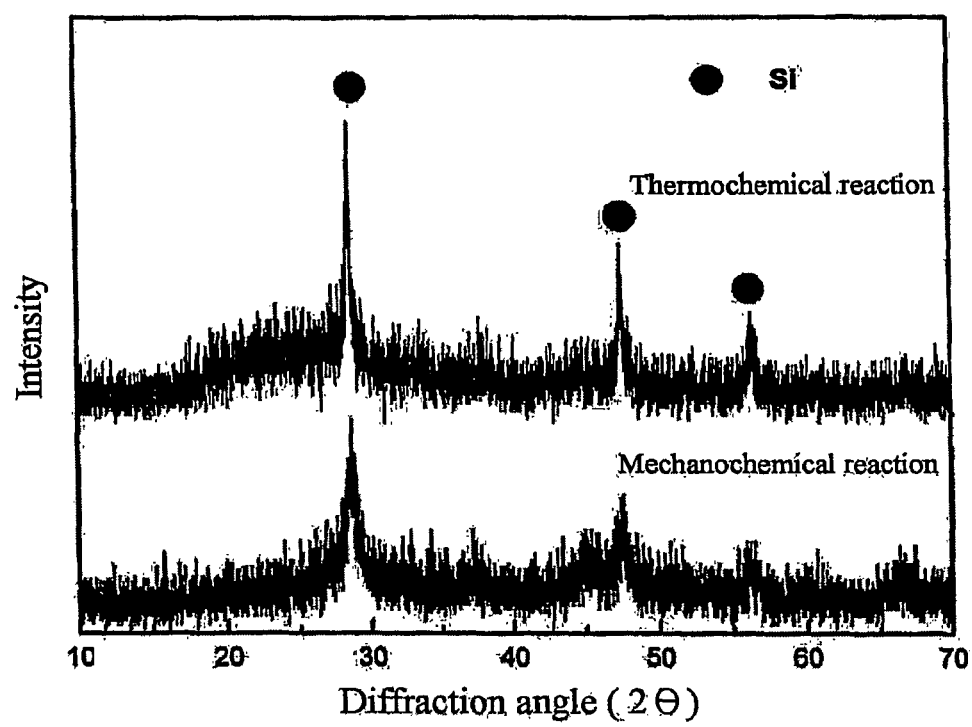
FIG. 13 illustrates X-ray diffraction patterns of Si-containing oxide complexs in accordance with Example 7.

FIG. 13 shows X-ray diffraction patterns of Al—Li—O oxide matrixs surrounding nano size Si, respectively, prepared by only a mechanochemical reaction following mixing of SiO, Al and $Li_2O_2$ in a molar ratio of 1:0.67:0.2, and a nano size Si-containing oxide complex prepared by a thermochemical reaction (powdered SiO, Al and $Li_2O_2$ were mixed and heat-treated at a temperature of 500° C. for 5 hours under argon atmosphere). The Si-containing oxide complexes obtained by the mechanochemical reaction and thermochemical reaction exhibit similar X-ray diffraction patterns, thus it can be seen that the thermochemical reaction can also easily obtain the nano size Si-containing oxide complex.

INDUSTRIAL APPLICABILITY

The anode active material in accordance with the present invention may realize a high capacity and an improved charge/discharge cycle life by preventing the mechanical destruction of the anode active material through restriction and alleviation of changes in volume resulting from reaction with lithium.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for preparing an anode active material for a lithium secondary battery, the method comprising:
   (a) a step of producing a complex composed of Si particles and an oxide surrounding the Si particles by mixing a silicon oxide and a material having a negative oxide formation enthalpy ($\Delta H_{for}$), an absolute value of which is greater than an absolute value of the oxide formation enthalpy of the silicon oxide by a mechanochemical process or subjecting them to a thermochemical reaction to reduce the silicon oxide;
   (b) a step of mixing the complex and a carbon material; and
   (c) a step of surface-modifying by coating the anode active material with a low crystalline or amorphous carbon material,
   wherein the material having the negative oxide formation enthalpy, the absolute value of which is greater than the absolute value of the oxide formation enthalpy of the silicon oxide, comprises Al.

2. The method according to claim 1, further comprising: ball milling the complex and the carbon material to form a composite material.

3. The method according to claim 1, further comprising: adding a lithium compound selected from the group consisting of $Li_2O$, $Li_2O_2$, $LiNO_3$, $Li_2S$ and mixtures of two or more thereof, in the step (a).

* * * * *